(12) United States Patent
Mantovani

(10) Patent No.: US 8,915,520 B2
(45) Date of Patent: Dec. 23, 2014

(54) ROLL-BAR STRUCTURAL ARRANGEMENT

(75) Inventor: Juliano Scheer Mantovani, Caxias do Sul-RS (BR)

(73) Assignee: Keko Acessórios S/A, Caxias do Sul, RS (BR)

( * ) Notice: Subject to any disclaimer, the term of this patent is extended or adjusted under 35 U.S.C. 154(b) by 0 days.

(21) Appl. No.: 14/129,532

(22) PCT Filed: May 14, 2012

(86) PCT No.: PCT/BR2012/000138
§ 371 (c)(1),
(2), (4) Date: Dec. 26, 2013

(87) PCT Pub. No.: WO2013/000047
PCT Pub. Date: Jan. 3, 2013

(65) Prior Publication Data
US 2014/0125044 A1 May 8, 2014

(30) Foreign Application Priority Data

Jun. 27, 2011 (BR) .................................. 9101298 U

(51) Int. Cl.
*B60R 21/13* (2006.01)

(52) U.S. Cl.
CPC ...................... *B60R 21/13* (2013.01)
USPC ............................................................ 280/756

(58) Field of Classification Search
CPC .............. B60R 21/13; B60R 2021/132; B60R 2021/134; B60R 2021/137
USPC ........................................................... 280/756
See application file for complete search history.

(56) References Cited

U.S. PATENT DOCUMENTS

| | | | |
|---|---|---|---|
| 4,148,504 A * | 4/1979 | Rushing | 280/756 |
| 4,795,188 A * | 1/1989 | Dueker | 280/756 |
| 5,641,193 A * | 6/1997 | Zepnik et al. | 296/107.09 |
| 5,718,454 A * | 2/1998 | Harrod | 280/756 |
| 6,247,743 B1 * | 6/2001 | Bonanno | 296/136.01 |
| 7,396,047 B1 * | 7/2008 | Young | 280/756 |
| 2006/0138763 A1 * | 6/2006 | Brady | 280/756 |
| 2009/0267335 A1 * | 10/2009 | Johnson et al. | 280/756 |

* cited by examiner

*Primary Examiner* — Paul N Dickson
*Assistant Examiner* — Robert A Coker

(57) ABSTRACT

A roll-bar structural arrangement featuring symmetrical covers that can be mounted both internally and externally of the structure of the accessory, on both sides, without the need for separate parts, said cover (30) being attached to the extension (11) of the roll-bar and ends fitted onto the central bar (10), and comprising single body parts shaped in the form of two symmetrical parts (301) and (302) and welded together via tongue and groove (not shown) placed on the edges, with a hollow inner region and featuring a leading segment (31) with a curvature coinciding with the curvature of the extreme portion of the central bar (10), and a secondary segment (32) projecting from the vicinity of the end of the leading segment (31), said secondary segment (32) accompanying the curvature of the extension (11) of the roll-bar, with ends of the leading segment (31) and of the extension (32) with an opening (33) with a section coinciding with the diameter of the central bar (10) and of the extension (11) of the roll-bar, and a hollow inside zone in which a metallic structure (40) is arranged.

2 Claims, 7 Drawing Sheets

ROLL-BAR STRUCTURAL ARRANGEMENT

This utility model discloses a roll-bar structural arrangement. More specifically, it comprises a roll-bar, which has symmetrical covers that can be assembled internally and externally in the structure of the accessory on both sides, without the need for providing separate parts.

Roll-bars are accessories widely used in off road vehicles, but also have the function of promoting user safety in vehicles with an open roof.

Usually, they are tubular structures fixed to the bodywork of the vehicle and have welding areas protected by covers that prevent corrosion and in addition ensure better aesthetic appearance to the assembly.

However, the manufacturing process of these covers requires large investments in matrices by using various tools for making different parts for the right side and left side, as well as the need for control and maintenance of different items for the same assembly.

Thus, it is an object of the present invention a roll-bar provided with a set of symmetrical covers to be fixed in the right and left sides of the accessory, thereby avoiding the need for a separate set of parts for the same purpose.

It is a characteristic of the utility model a constructive disposition of a roll-bar, which features symmetrical finish covers, arranged on the right and left sides of the surface of the accessory.

It is a characteristic of the utility model a roll-bar structural arrangement, which features symmetrical finish covers fixable on both sides of the accessory, facilitating the control of components and installation.

It is a characteristic of the utility model a roll-bar structural arrangement, which features symmetrical finish covers that eliminate the need of double investment in tooling.

It is a characteristic of the utility model a roll-bar structural arrangement that allows for the installation of a jacket to the finish covers, allowing for the customization of the accessory.

In order to better describe the technical characteristics of the roll-bar structural arrangement, the figures listed below are presented:

The roll-bar structural arrangement, the object of this utility model, comprises symmetrical finish covers fixed on the right and left sides of the accessory surface in order to protect the weld area of the lateral segment with the roll-bar central bar.

The attachment of symmetrical finish covers enables the manufacturing of a single part, which can be applied indifferently on both sides of the roll-bar, thereby avoiding duplication of costs with matrices and fixing operations.

Figure 1:
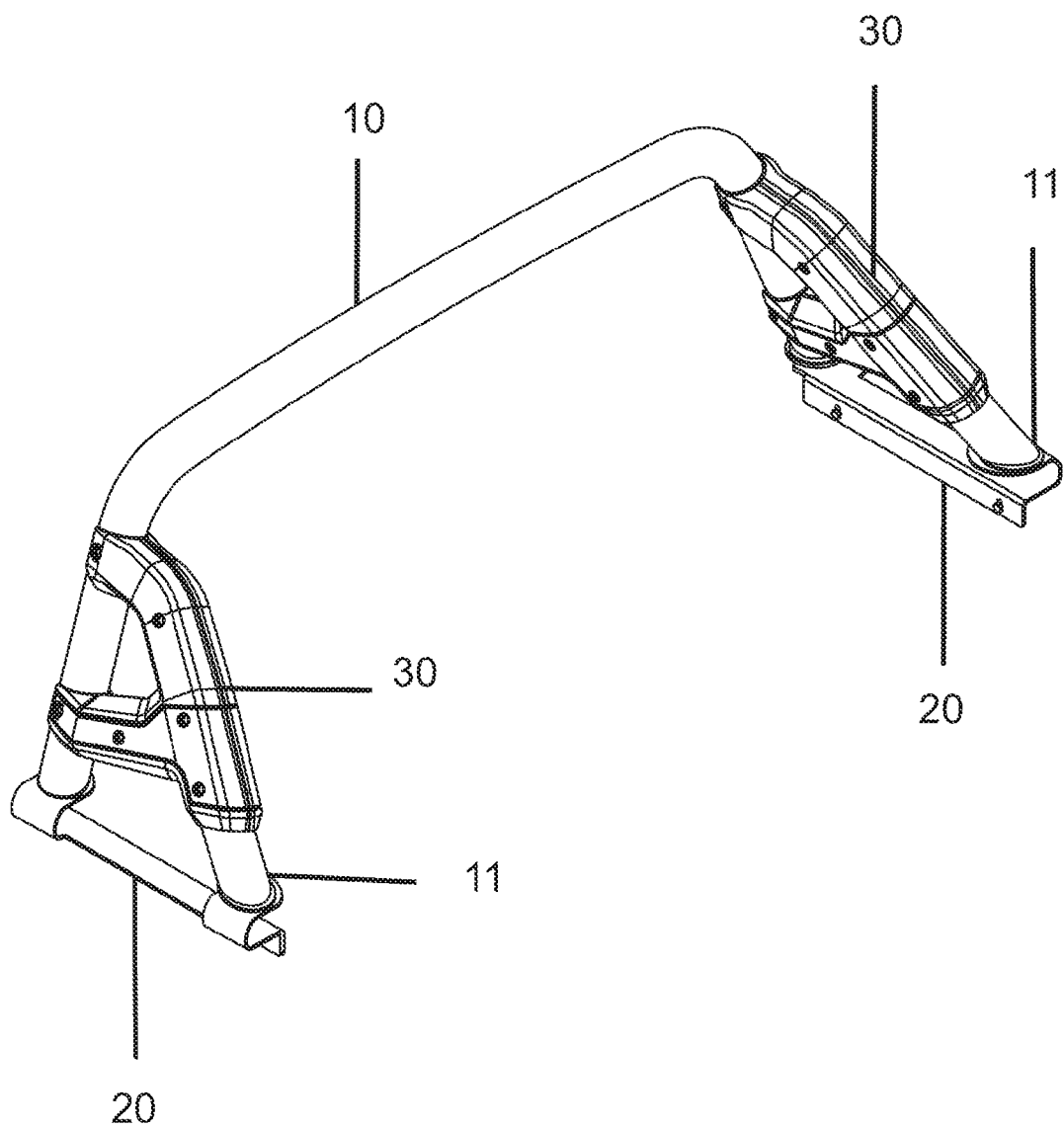
FIG. 1 depicts a perspective view of the roll-bar, showing the attachment of the symmetrical covers in the inner and outer region of the right and left sides of the surface of the accessory.
Figure 2:
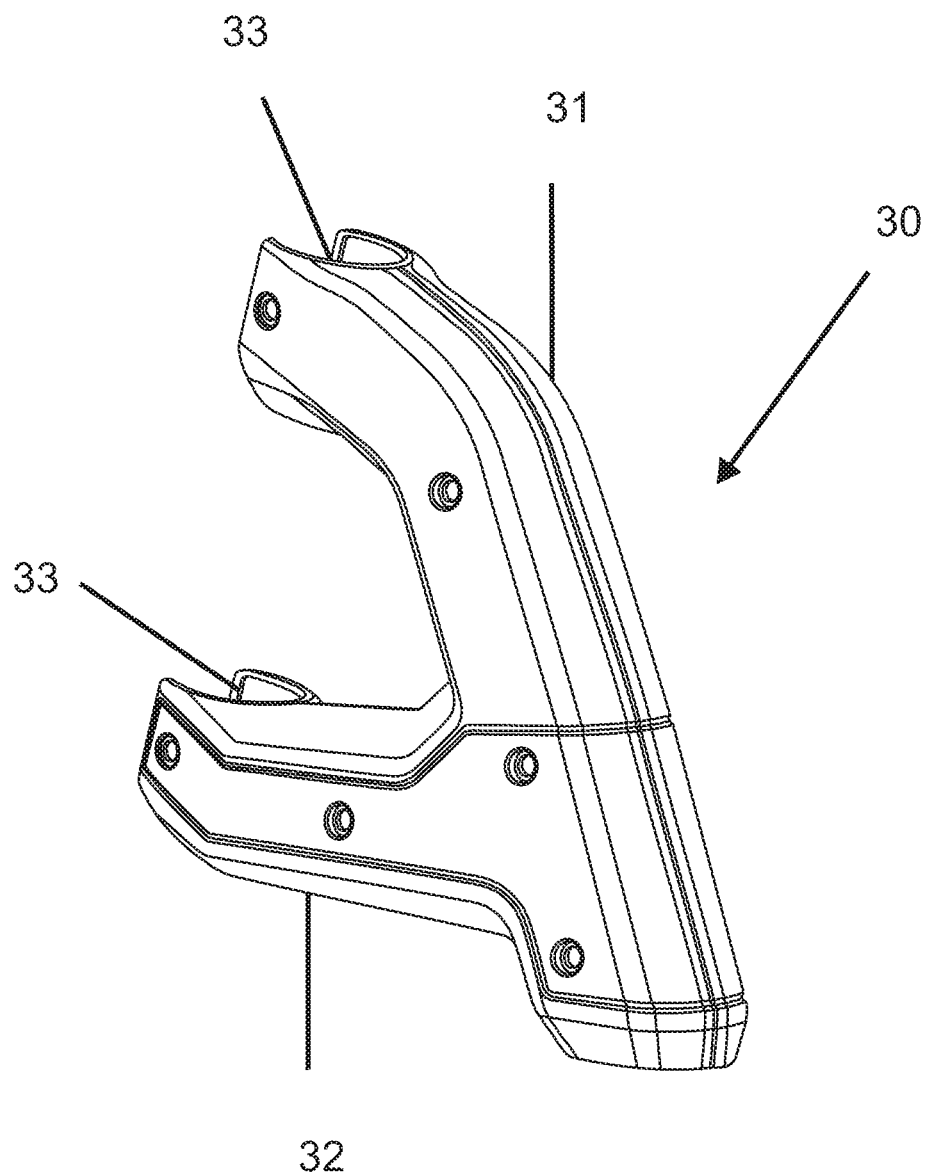
FIG. 2 shows a perspective view of the cover.
Figure 3:
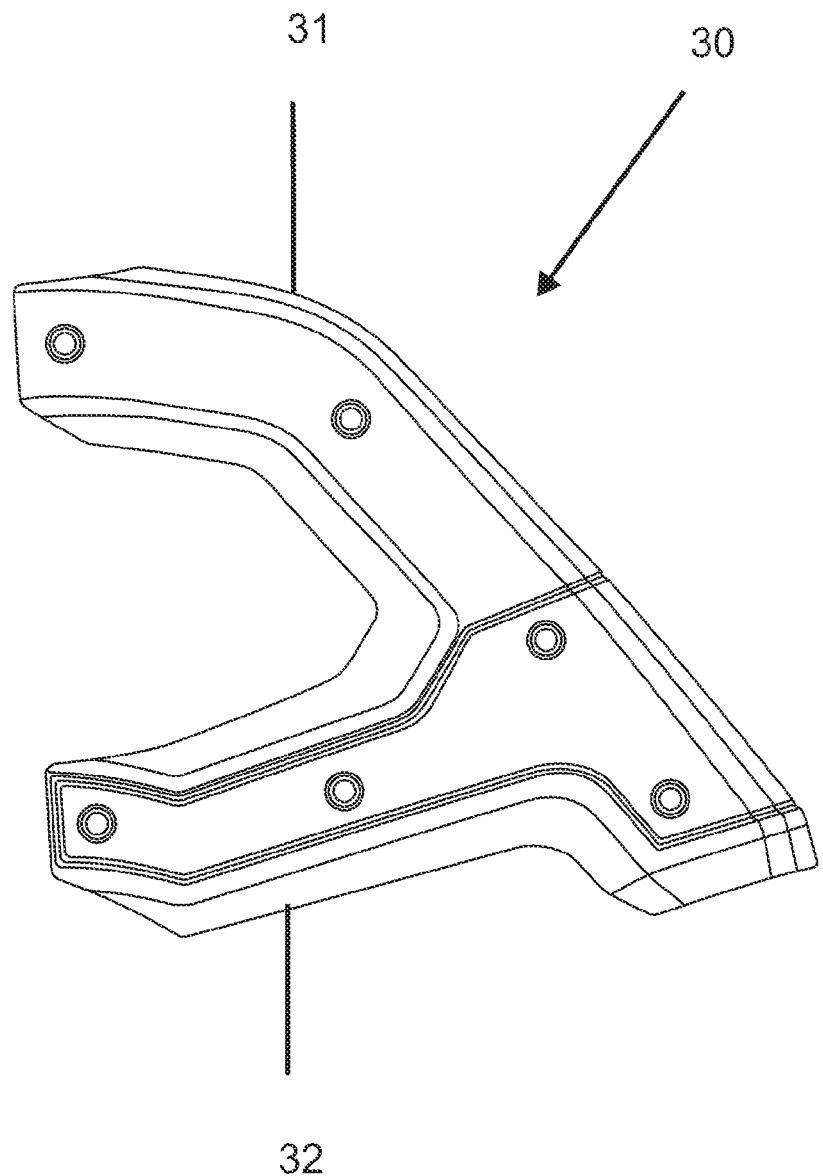
FIG. 3 shows the front view of the cover.
Figure 4:
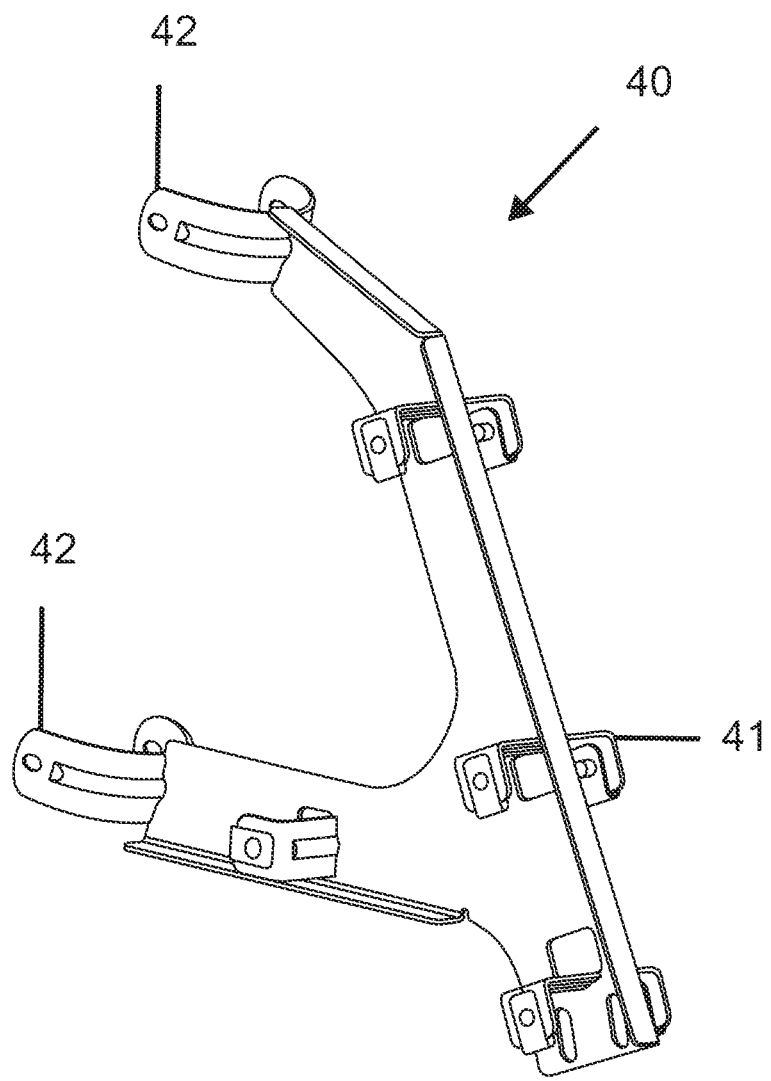
FIG. 4 shows a perspective view of the metal core laid out in the inner region of the cover.
Figure 5:
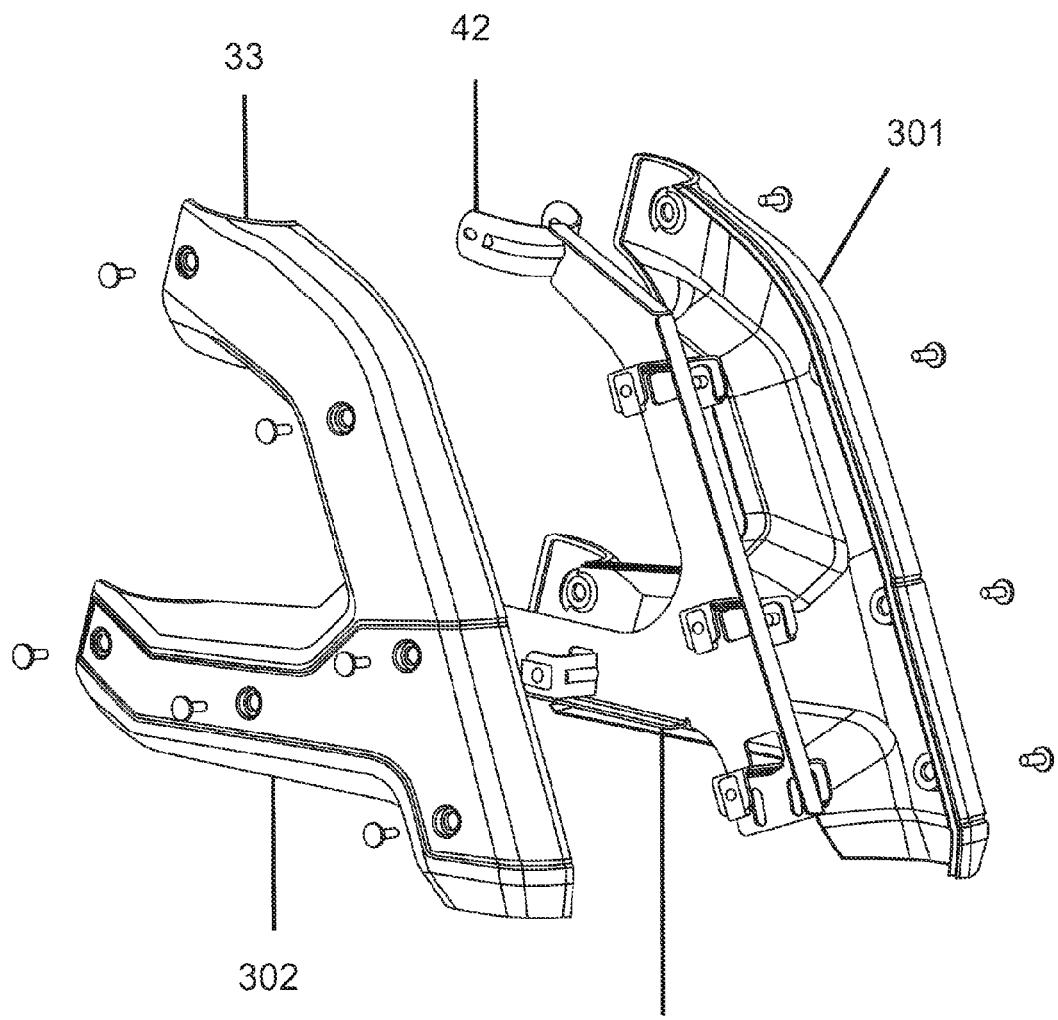
FIG. 5 shows an exploded view, showing the metal core that allows for the connection of the finish cover with the roll-bar central bar.
Figure 6:
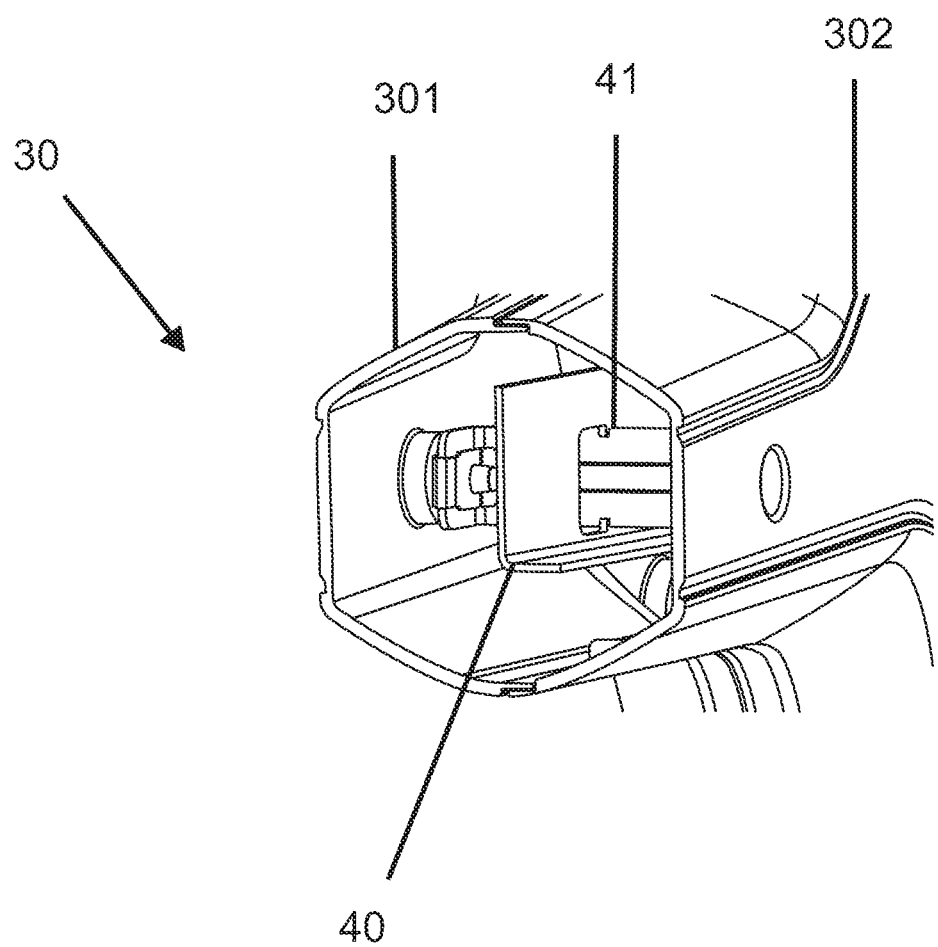
FIG. 6 shows details of the cover fixing on the roll-bar surface by fixing means arranged on the metallic structure.
Figure 7:
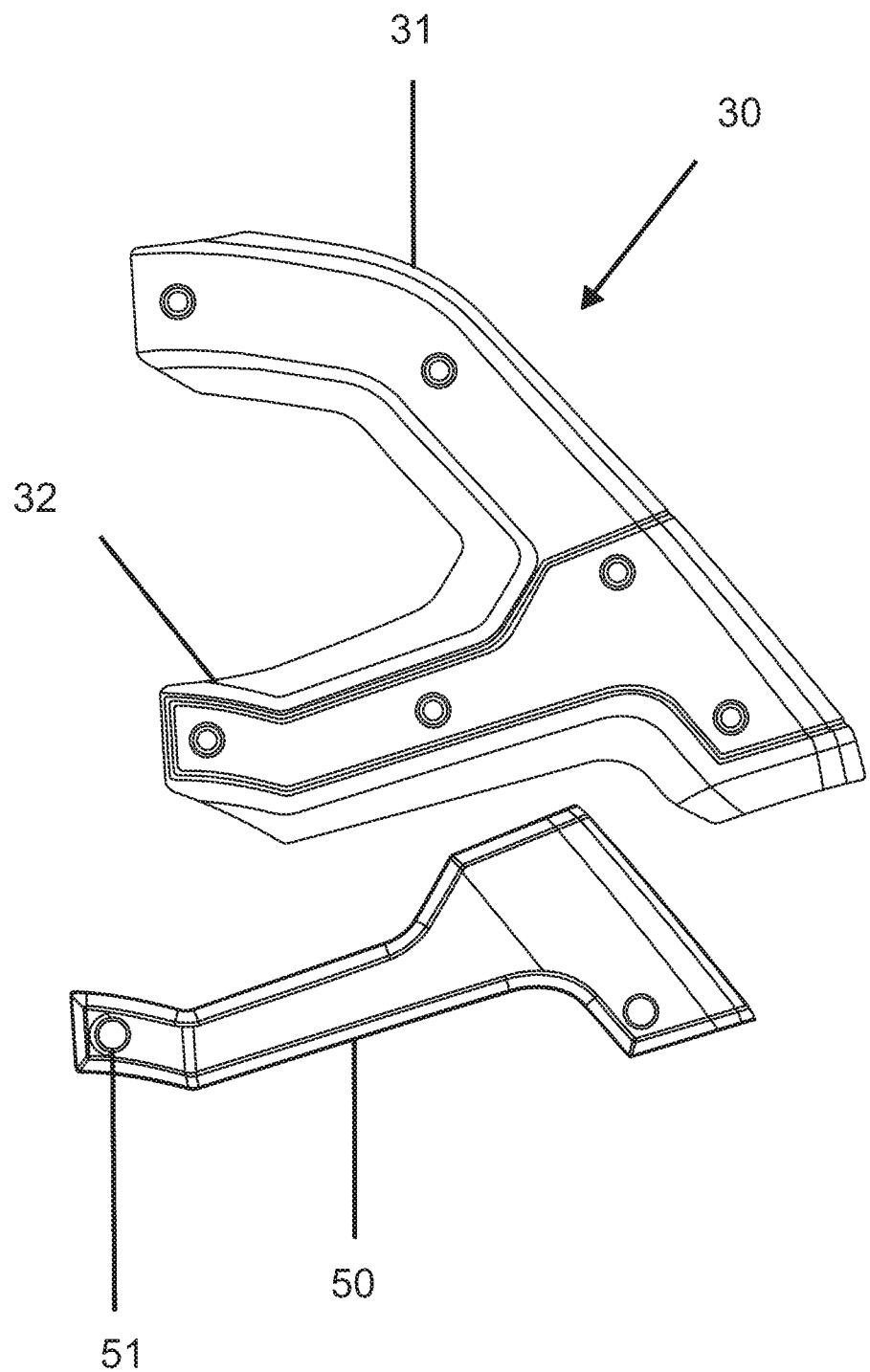
FIG. 7 shows a perspective view showing a jacket that can be attached to the finish cover in order to customize the accessory.

The roll-bar comprises at least a "U"-shaped central bar (10) whose ends have a base (20) which allows for the attachment of said central bar (10) to the vehicle bodywork. On each side of the central bar (10), an extension protrudes (11) which connects the base (20), said extension (11) being welded to the central bar (10) by soldering. In the region of the weld a finish cover (30) is placed which protects against corrosion and provides aesthetic finish, said finish cover (30) having the body attached to the extension (11) of the roll-bar and the ends embedded in the central bar (10), as shown in FIG. 1.

The finish covers (30) comprise single body parts, preferably of plastic material, said covers (30) shaped in the form of two symmetrical parts (301) and (302) and welded together via tongue and groove (not shown) placed on the edges, with a hollow inner region.

The finish covers (30) have a main segment (31) with curvature coinciding with the curvature of the extreme portion of the central bar (10), and a secondary segment (32) projecting from the vicinity of the end of the leading segment (31), said secondary segment (32) accompanying the curvature of the extension (11) of the roll-bar.

The ends of the leading segment (31) and of the extension (32) have an opening (33) with a section coinciding with the diameter of the central bar (10) and of the extension (11) of the roll-bar.

The finish covers (30) present in the hollow inner region the disposition of a metal structure (40) having flanges with through holes (41) for positioning of fixing means which attach the cover (30) to the central bar (10) of the roll-bar, rendering the setting not apparent, which does not affect the accessory aesthetics. At the ends of the metal structure (40) semicircular shaped brackets (42) are arranged which are positioned adjacent to the openings (33) of the cover (30).

Optionally, a jacket (50) is fixed on the finish cover (30) by fixing means positioned in through holes (51), said jacket (50) being positioned on the secondary segment (32) and allowing for the customization of the accessory.

The invention claimed is:

1. A roll-bar structural arrangement comprising at least a "U"-shaped central bar (10) whose ends have a base (20) which allows for the attachment of said central bar (10) to a vehicle bodywork and on each side of the central bar (10), an extension (11) protrudes, which connects the base (20), said extension (11) being welded to the central bar (10) by soldering, characterized by presenting a finish cover (30) attached to the extension (11) of a roll-bar and embedded in the central bar (10), said finish cover (30) comprising single body parts shaped in the form of two symmetrical parts (301) and (302) and welded together, with a hollow inner region and having a leading segment (31) with a curvature, and a secondary segment (32) projecting from a vicinity of an end of the leading segment (31), said secondary segment (32) accompanying a curvature of the extension (11) of the roll-bar, with ends of the leading segment (31) and of the secondary segment (32) having an opening (33) with a section coinciding with the diameter of the central bar (10) and of the extension (11) of the roll-bar and hollow inner region showing disposition of a metal structure (40) having flanges with through holes (41), having in ends of the metal structure (40) semicircular shaped brackets (42) which are positioned adjacent to openings (33) of the cover (30).

2. The roll-bar structural arrangement according to claim 1, further comprising a jacket (50) positioned on the secondary segment (32) of the finish cover (30).

* * * * *